July 14, 1931.　　　L. J. ARMSTRONG　　　1,814,020

SPRAY ATTACHMENT FOR FAUCETS

Filed Nov. 8, 1929　　2 Sheets-Sheet 1

Inventor

L. J. Armstrong

By Clarence A. O'Brien
Attorney

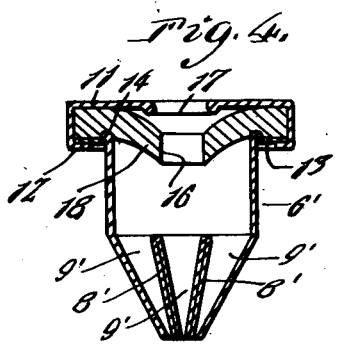
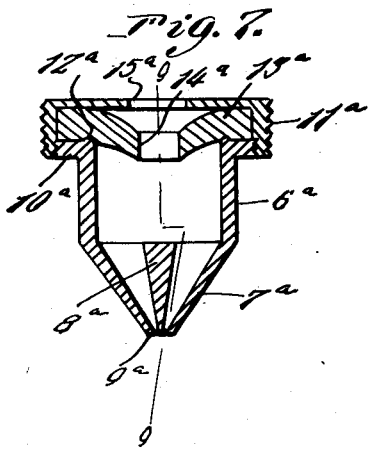
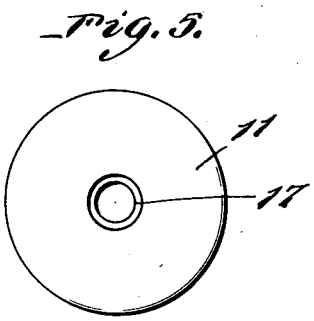
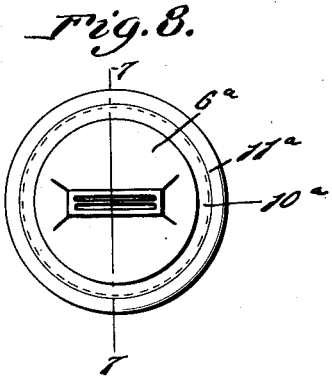
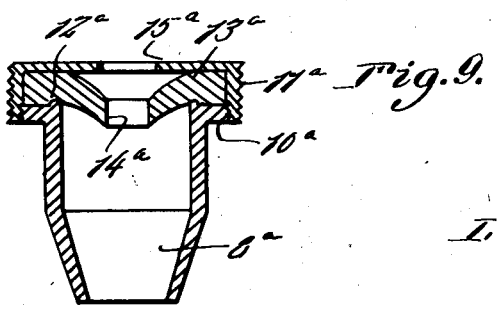

Patented July 14, 1931

1,814,020

UNITED STATES PATENT OFFICE

LEONARD J. ARMSTRONG, OF MARINERS HARBOR, NEW YORK

SPRAY ATTACHMENT FOR FAUCETS

Application filed November 8, 1929. Serial No. 405,708.

The present invention appertains to new and useful improvements in liquid spray devices, and more particularly to a novel attachment for use on faucets to produce a forceful spray useful in washing dishes and other items.

Another object of the invention is to provide a hollow body having a downwardly tapered lower end forming the outlet thereof, and having a pair of partitioning means therein forming a number of downwardly tapered passages of elongated form in cross section with narrow elongated outlet ends which provide a number of flat elongated streams of water which escape from the device with sufficient force to wash dishes and other articles.

The reader of the following specification and claims will recognize other important objects and advantages of the invention.

In the drawings:

Figure 4 is a sectional view longitudinally through a modification of the invention.

Figure 5 represents an end view of the modification shown in Figure 4.

Figure 7 is a longitudinal sectional view through still another modification of the invention, this view being taken substantially on line 7—7 of Figure 8.

Figure 8 represents an end view of the form of the invention shown in Figure 7.

Figure 9 represents a sectional view taken substantially on line 9—9 of Figure 7.

Figure 1:
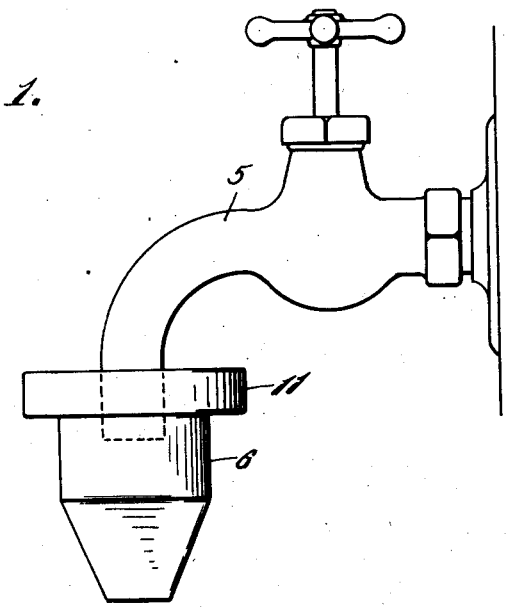
Figure 1 represents a side elevational view of a faucet with the novel attachment associated therewith.

Referring to the drawings, wherein like numerals designate like parts, the numeral 5 generally refers to a faucet of conventional construction.

Figure 2:
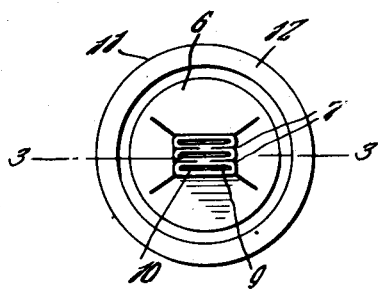
Figure 2 represents an end view of the attachment.
Figure 3:
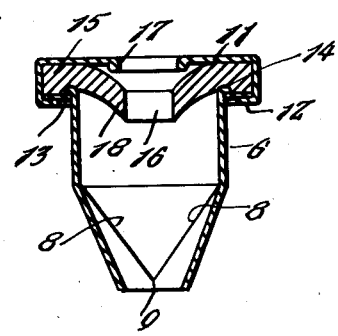
Figure 3 represents a sectional view through the attachment taken on line 3—3 of Figure 2.

The preferred form of the invention is shown in Figures 1, 2 and 3, wherein a cylinder 6 constructed of sheet metal, or in fact some other suitable material is folded inwardly at one end, as at 7 to provide inwardly disposed flanges 8. These flanges are jointed together as at 9 to partition off the interior of the cylinder so as to provide three (more or less) narrow outlet openings 10.

The converging disposition of these flanges 8 cause the liquid to gush through the narrow openings 10 with considerable force. The cylinder is provided with a head construction referred to by numeral 11, and this head structure is in the form of a hollow cap flanged inwardly as at 12. An annulus 13 is arranged within the head and against the cap 12 while a beading 14 is provided against the corresponding end of the cylinder 6 to bear against the said annulus.

A circular body 15 of some suitable resilient material is disposed within the cap so that the opening 16 thereof will register with the opening 17 in the cap 11. The central portion 18 of the circular body 15 is bulged inwardly in the manner shown in Figure 3, so that the opening 16 will readily expand when the attachment is engaged with the faucet 5.

The form of the invention shown in Figures 4 and 5 includes a cylinder 6' of sheet metal or some other suitable material. The cap structure in this form is identically the same as shown in Figure 3 and the difference in this form over that shown in Figure 3 is in the partition 8'.

The outer end of the cylinder 6' is folded inwardly and pressed so as to produce the flanges 8'—8' which assume a downwardly converging disposition, the ends thereof nearest to each other being only slightly spaced apart. These partitions extend substantially half way through the cylinder 6' and water entering the device from the faucet 5 and passing into the tapering raceway 9' will issue from the constricted end of the cylinder with considerable force.

Figure 7 shows another form of the invention. This includes a cylinder 6a which is tapered at one end as at 7a. Mounted within this tapered end portion of the cylinder is a downwardly tapering wedge 8a having its reduced end disposed within the opening 9a of the cylinder. Thus the outlet of the cylinder is divided into a pair of outlets. The upper end of the cylinder 6a is provided with downwardly disposed circumferentially extending flange 10a which is provided with peripheral threads. These threads engage with the internally threaded cap 11a and as shown in Figure 7, the upper end of the cylinder 6a is provided with a beading 12a to bite into the resilient body 13a.

This body 13a is of circular shape and is provided with a central opening 14a. The cap 11a is provided centrally with an opening 15a which registers with the opening 14a. The central portion of the body 13a is bulged inwardly to facilitate the insertion of a faucet within the opening 14a.

Figure 6:
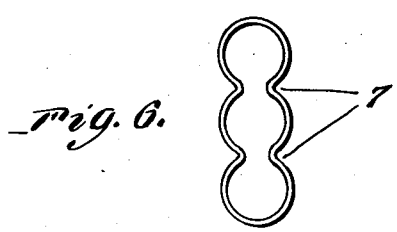
Figure 6 represents a fragmentary view of the cylinder 6 after the operation of crimping the same, but prior to the compressing of the same to the shape shown in Figure 2.

Figure 6 shows the construction of the cylinder 6 after the operation of crimping the same and prior to the operation of pressing the same to the position shown in Figure 2.

The means for attaching the device to a faucet is claimed in my copending application Serial No. 428,415 filed February 14, 1930.

It will thus be seen that this novel spray attachment for faucets offers considerable novelty over devices of this nature heretofore devised. While the foregoing specification offers several forms of the invention, it is to be understood that changes aside from those shown and specified may be resorted to without departing from the spirit and scope of the invention as claimed hereinafter.

Having described the invention, what is claimed as new is:

A spray attachment for faucets comprising a hollow body having a downwardly tapered lower end which forms the outlet end of the body and means for partitioning said tapered portion for forming a number of downwardly tapering passages of elongated form in cross section with narrow elongated outlet ends.

In testimony whereof I affix my signature.

LEONARD J. ARMSTRONG.